March 19, 1935.    L. DE FLOREZ ET AL    1,994,983
APPARATUS FOR INDICATING AND/OR CONTROLLING PHYSICAL CHANGES
Filed Jan. 27, 1931    2 Sheets-Sheet 1
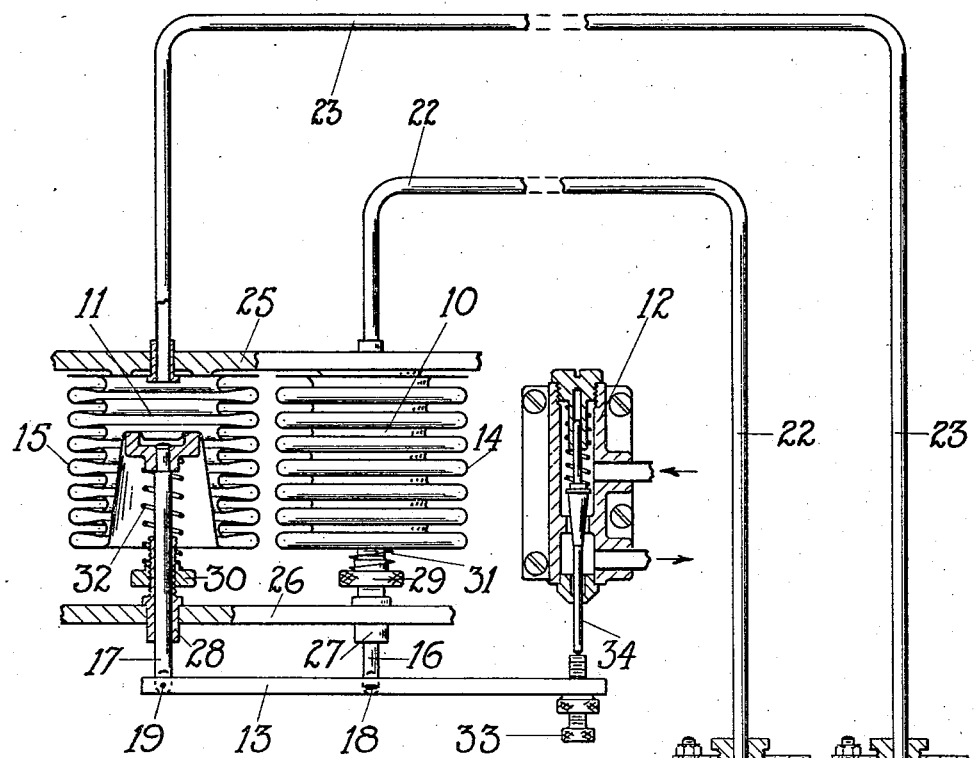
Fig. I
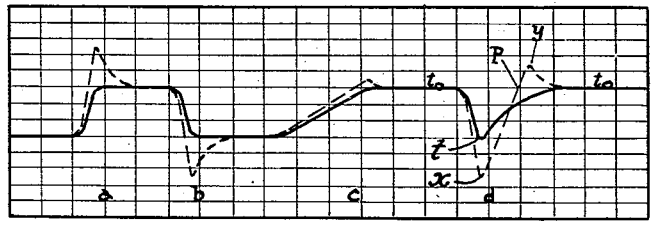
Fig. II
INVENTORS
Luis de Florez & Emmon Bach.
BY Hoguet + Neary
their ATTORNEYS March 19, 1935.   L. DE FLOREZ ET AL   1,994,983
APPARATUS FOR INDICATING AND/OR CONTROLLING PHYSICAL CHANGES
Filed Jan. 27, 1931   2 Sheets-Sheet 2
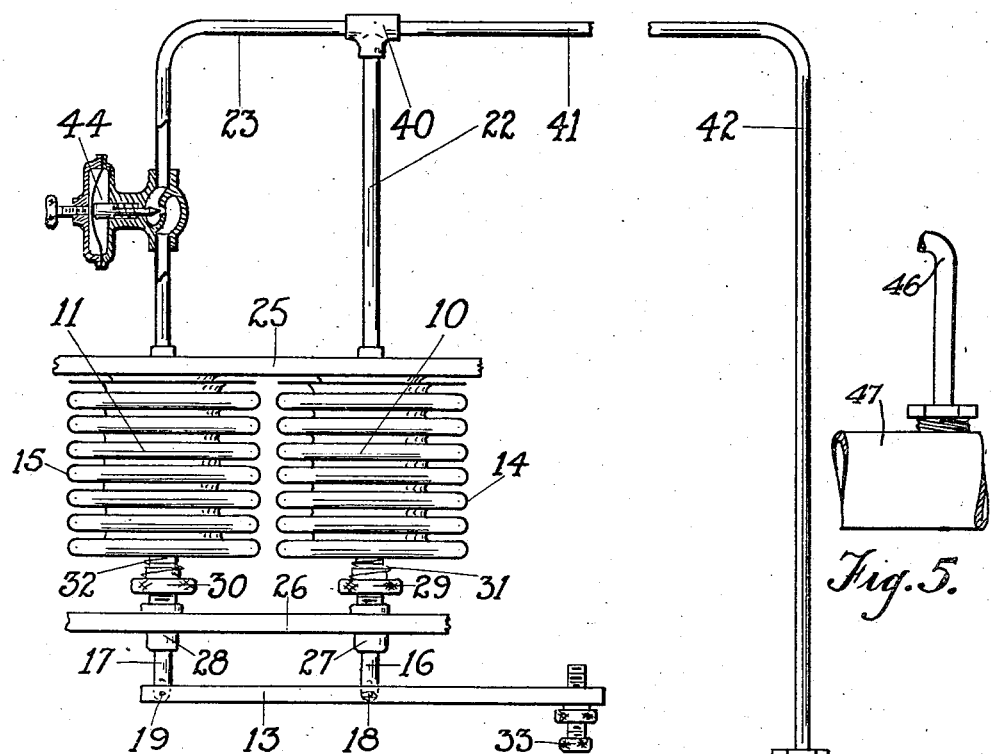
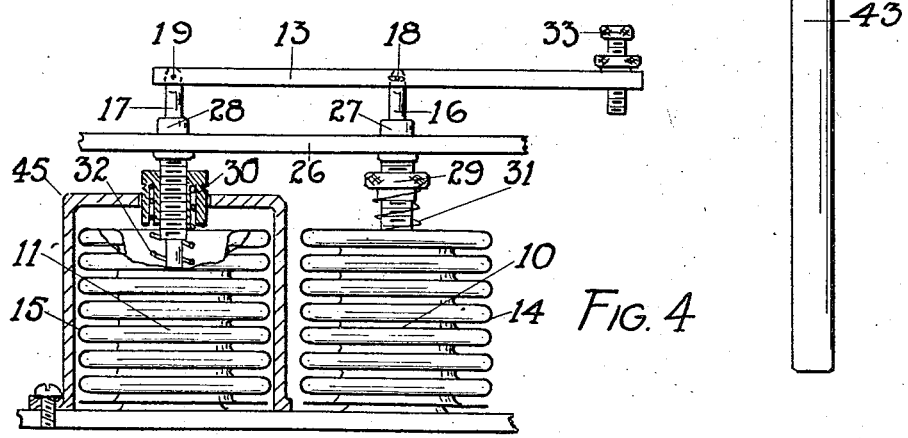
INVENTORS
Luis de Florez & Emmon Bach.
BY Hoguet + Neary
their ATTORNEYS Patented Mar. 19, 1935

1,994,983

UNITED STATES PATENT OFFICE 1,994,983

APPARATUS FOR INDICATING AND/OR CONTROLLING PHYSICAL CHANGES

Luis de Florez, Pomfret, Conn., and Emmon Bach, New York, N. Y., said Bach assignor to said de Florez Application January 27, 1931, Serial No. 511,552

10 Claims. (Cl. 236—99)

This invention relates to devices for indicating, recording and controlling physical changes with respect to the rate as well as the degree of such change. In its broader and more general aspects the invention is concerned with an apparatus which will respond to changes in the physical condition of a controlled system communicating therewith, in accordance with the characteristic time relationships, within said system, between operating factors and the effect thereof. More particularly the invention provides a novel combination of mechanical devices, the movement of which, at a time of pressure or temperature change, will initiate and maintain a pressure or temperature regulating operation based upon the rate of such change and anticipating the full extent thereof.

The present invention, while of general application in the field of pressure or temperature measurement, has particular industrial utility in connection with pressure or temperature control. The successful operation of many industrial processes is conditioned upon maintaining a substantially constant pressure or temperature, and it is therefore desirable to utilize a control system which will operate to prevent physical changes of undue magnitude and duration as well as occasioning a return to normal after a change has occurred. Such processes further are usually characterized by an interval between the time of occasioning a regulating change in operation and the time when the full effect thereof is felt at the point of pressure or temperature control. This time interval is appreciable and induces the familiar phenomenon of "hunting" in a control system which is based solely upon the instantaneous values of process pressure or temperature without regard to the rate of change therein and which makes no provision for compensating, to any extent, the characteristic lag of the process. This invention contributes materially to the improvement of pressure or temperature control systems by providing a means of initiating regulatory steps, at a time of physical change, which are more than is proportionately necessary to counteract the initial extent of such change and then proportioning the compensation of the initial over-correction to the rate of the return to normal in the physical condition of the process under control.

In the accompanying drawings, which present several applications of the principles underlying the invention (like reference characters denoting like parts), Figure I shows a form of the invention in which the apparatus is responsive to temperature and temperature changes, together with an illustrative adaptation thereof to temperature control;

Figure II is a graphical representation of the operating characteristics of the invention in connection with the indication and/or control of physical changes;

Figure III shows a modification wherein the apparatus is responsive to pressure temperature or temperature changes;

Figure IV shows a further modification of the invention (analogous to the form shown in Figure I) responsive to temperature and temperature changes; and Figure V shows a broken detail of a modification of the control apparatus shown in Figure III.

Referring now to Figure I the apparatus comprises two mechanical devices 10 and 11, movement in which is occasioned by changes in process temperature, operating a regulatory mechanism 12 through the medium of the lever 13. In the particular modification shown, the mechanical devices 10 and 11 comprise the collapsible bellows 14 and 15 transmitting pressure through the rods 16 and 17 to the lever 13 at the contact points 18 and 19. Two vessels, 20 and 21 (which may conveniently be in the form of elongated cylindrical tubes), containing heat sensitive fluid, are located in the desired process temperature zone, and communicate with the bellows 14 and 15 through the pipes 22 and 23 respectively. The vessels are subjected to the same process temperature, but the full response of the vessel 21 thereto is delayed by surrounding it with thermal insulation 24 to retard the flow of heat to and from this vessel.

The bellows 14 and 15 are mounted on the fixed support 25 and connect with the lever 13 through the rods 16 and 17, pivotally attached to said lever at the points 18 and 19 respectively. The fixed support 26 carries the sleeves 27 and 28 acting as guides for the rods 16 and 17. Adjusting nuts 29 and 30, threaded on the sleeves 27 and 28, provide means for regulating the tension in the springs 31 and 32 mounted thereon. The said springs respectively determine the position of the points 18 and 19 of the lever 13 with respect to the pressure within the bellows 14 and 15.

In the depicted mode of adapting this form of the invention to temperature control, the free end of the lever 13 operates a regulatory mechanism 12, which may, for example, be a fuel supply control valve. It is to be understood, however, that the auxiliary structure shown is merely illustrative and that the invention contemplates the use, in this connection, of any desired mechanical or electrical devices. In the structure shown the adjusting screw 33 is in continuous contact with the valve stem 34 (although not connected thereto) and provides for the relating of process temperature values to the degree of valve opening which will occasion a fuel supply necessary to establish and maintain such temperature values under static process conditions. Thus the desired process temperature datum level may be easily and simply regulated to accord with occasional or periodical changes in the operating characteristics of the process.

When the form of the invention shown in Figure I is adapted to its intended use, the tubes 20 and 21 are placed in an industrial vessel or conduit in such a manner as to locate both of said tubes in the same process temperature zone. The fluid spaces of the said tubes are of the same dimensions and the heat sensitive fluid contained therein is of the same amount and composition. The said fluid is of such a character that its vapor pressure is substantially proportional to the temperature to which it is subjected, and thus the resulting pressures in the tubes 20 and 21, respectively, will be identical whenever the fluid in the tube 20 is at the same temperature as the fluid in the tube 21. Such a condition of pressure equilibrium within the apparatus corresponds to a constant process temperature period, and during such a period the lever 13 lies in a horizontal plane at a level dependent upon and indicative of the magnitude of the constant process temperature, provided that the springs 31 and 32 have been adjusted to the same tension.

If an increase in process temperature occurs, the full response of the fluid in the tube 20 will be substantially instantaneous while the full response of the fluid in the tube 21 will be delayed. Consequently a temporary pressure differential is set up between the device 10 and the device 11 which causes a movement differential between the points 18 and 19 respectively, and hence the lever 13 moves away from the horizontal. The apparatus is so calibrated that the position of the point 18 continuously measures instantaneous values of the process temperature, and the movement of the lever 13 at said point is a measure of the actual change in process temperature. The movement of the free end of the lever 13 will then represent a magnification of the process temperature increase, the percentage magnification being a function of the distance of said free end from the point 18 (at which point the magnification is zero). The actual amount of such magnification, for any given point on the lever 13 to the right of the point 18, is a function of the angle said lever makes with the horizontal.

As long as the process temperature is changing either away from or back to its datum level), the point 18 on the lever 13 will lead the point 19, since process temperature values are reflected immediately at the point 18 while the response of the point 19 to the same process temperature values is delayed for a time interval corresponding to the temperature response lag between the tubes 20 and 21. The tendency of movement at the point 19 is toward returning the lever 13 to a horizontal position at the original level thereof. Thus the angle of the lever 13 with the horizontal, during a period of process temperature change, will vary continuously during such period and at a rate proportional to the temperature change rate. The amount by which the process temperature change is magnified in the movement of the lever 13 at its free end will therefore vary in accordance with the rate of such change.

Assuming that the regulatory mechanism controls fuel supply, the setting of the screw 33 relates normal fuel supply to normal process temperature and as long as the lever 13 is at the proper horizontal level the control valve 12 will maintain a fuel rate corresponding thereto. Movement of the free end of the lever 13 is transmitted directly to the mechanism 12 occasioning a movement of the valve stem 34. When the lever 13 is at an angle to the horizontal, the valve 12 will therefore pass an amount of fuel which is more than that proportionately necessary to maintain the actual instantaneous process temperature, when that temperature is decreasing, and which is less than the proportionate amount when the said temperature is increasing. Thus the device provides for the compensation of the characteristic process lag by magnifying the effect of a temperature change in the response of the control mechanism, thereby initiating a return to normal process temperature at a rate which will inhibit any substantial further temperature change in the original direction. In other words, the change in fuel supply (or other regulatory operation) leads the process temperature change during the period of change by an amount proportional to the rate of such change.

The preceding discussion of the operation of the form of the invention shown in Figure I in connection with the control of temperature is premised primarily upon a condition of positive initial temperature change. When the initial process temperature change is negative (that is to say a decrease) the functional operation of the apparatus is the same as for an increase in temperature. The movement direction of the several units thereof will, however, be in the opposite direction at the various stages of the operation.

A graphical representation illustrating the movement reactions of the apparatus when adapted to its intended use is shown in Figure II. Time is plotted against movement magnitude and several conditions of varying process temperature are shown. In the figure the solid line represents the movement of the point 18 on the lever 13 corresponding to the actual process temperature, and the broken line represents the movement of the free end of the lever 13 corresponding to a magnification of the process temperature in accordance with the rate of change thereof. It will be noted that the broken line merges with the solid line during periods of thermal equilibrium corresponding to a horizontal position of the lever 13.

When the apparatus is functioning merely as an indicating and/or recording device the sections of Figure II marked "a", "b" and "c" respectively illustrate its performance under various process temperature conditions. At "a" an abrupt increase in process temperature to a new constant level is outlined by the movement of point 18 along the solid line of the figure. Since the full movement response of the point 19 is delayed, the movement of the free end of the lever indicates a magnification of this temperature change along the broken line, which magnification is large in amount since the change occurred abruptly. The movement of the point 19 gradually brings the lever 13 to a horizontal position corresponding to the new temperature level, thus reducing the movement differential in the apparatus to zero and effecting a merger of the solid and broken lines in Figure II. At "b" the response of the apparatus to an abrupt process temperature change in the opposite direction is represented while at "c" a more gradual change in process temperature is illustrated, the movement differential between the points 18 and 19 being less in accordance with the diminished rate of temperature change.

Section "d" of Figure II illustrates the functioning of the invention in conjunction with an automatic temperature control system regulating some temperature controlling operation factor, such as fuel supply. In passing it may be noted that the ordinates of Figure II may be considered as representing temperature values as well as movement magnitude of points on the lever 13 corresponding thereto. In the figure "$t_0$" indicates the predetermined process temperature datum level which is desired and which the control system has been set to maintain. As long as the temperature remains at this level the control system is static since vessels 20 and 21 are both responding fully to the same temperature. Assume now that the process temperature suddenly decreases toward the value "$t$" a resulting movement differential between the device 10 and the device 11 occasions a magnified response to this change in the regulating mechanism 12 by reason of the magnified movement of the free end of the lever 13. An increase in fuel supply to the unit, at a time and to a degree sufficient to prevent the process temperature dropping substantially below the point "$t$", is immediately established. The time temperature relations of the process and process equipment, to which the movement characteristics of the control apparatus have been correlated, will determine the amount by which the fuel supply is increased over that proportionately necessary to offset the actual temperature change, in order that the time interval, which must elapse before the effect of increase in fuel supply is felt at the point of temperature control, may be compensated. This overcorrection will vary in amount as the process temperature returns to normal in accordance with the rate at which such return progresses. Thus, as the process temperature increases from the point "$t$" in its return to the datum level "$t_0$", the increase in fuel supply will diminish and since the change in fuel supply leads the change in temperature, the fuel supply increase will pass through a zero point and become a temporary decrease, although the process temperature is still increasing. This will result in diminishing the rate of temperature return during the last stages thereof, occasioning in turn a second increase in fuel supply at a rate sufficient to balance this factor to the process temperature at the datum level. In the figure the broken line, which represents the movement of the free end of the lever 13, corresponds to the change in fuel rate, the point "$x$" corresponding to the maximum increase in fuel supply, the point "$y$" corresponding to the maximum decrease in fuel supply and the point "$p$", representing a momentary horizontal position of the lever 13 during the temperature regulating operation, corresponding to the point at which an actual decrease in fuel supply is initiated, although the process temperature is still increasing. It will be noted that the regulatory operation of this invention in controlling temperature is free from the familiar and undesirable phenomenon of "hunting" common to many temperature control systems. A similar graphical analysis applies to the operation of the device when the initial process temperature change is an increase instead of a decrease, the deviations of the curves from the normal being opposite in direction in such a case.

In Figures III and IV, two additional modifications of the invention are represented. In each case the effective functional operation is the same as that described in connection with the modification shown in Figure I. The three depicted forms of the invention are also substantially alike with respect to details of structure, the major difference between the three lying in the mode of occasioning the delayed response of one unit of the apparatus to the physical changes being indicated and/or controlled. In the form shown in Figure III the structural modification referred to makes the apparatus adaptable to indicating and/or recording either pressure or temperature changes whereas the forms shown in Figures I and IV are adaptable only to temperature operation. In the three figures, like reference characters denote like parts.

Referring now to Figure III, the pipes 22 and 23 establish communication, between the apparatus and an external process pressure or temperature zone, through the "$t$" 40 and the pipe 41. The pipe 42, which may be considered as an extension of the line 41 (or as a separate pipe connected therewith), is connected, in the depicted assembly, to tube 43 containing heat sensitive fluid of the character described in connection with Figure I. The tube 43 is placed in the desired process temperature zone and the fluid therein responds fully and immediately to changes in process temperature since the said tube is not thermally insulated. In this form of the invention movement response delay in the device 11 is occasioned by providing the regulating valve 44, carried by the pipe 23, which creates a pressure differential between devices 10 and 11 at a time of process temperature change. The adaptation of this form of the invention to process pressure changes simply involves connecting the pipe 41 by means of pipe 46 with fluid space of an industrial vessel or conduit 47 as shown in the broken detail Figure V instead of with the tube 43 as in the drawings. The pressure in the control apparatus will then be produced directly by the process pressure instead of being a pressure translation of process temperature as in the first instance. In either instance the functioning of the several mechanical units of the apparatus is the same as hereinbefore described for Figure I.

The form of the invention shown in Figure IV is also structurally similar to the form shown in Figure I and is similarly adaptable only to temperature operation. The movement of the several parts of the apparatus, in response to process temperature changes, is, however, actuated by the pressure reactions, to said changes, of heat sensitive fluid contained within the bellows 14 and 15. The tubes 20 and 21 of Figure I are thus dispensed with in the Figure IV modification. This structural change in the apparatus necessitates placing said apparatus directly in the process temperature zone, giving this form of the invention special applicability to the indication and/or control of relatively low temperature processes and systems (as, for example, controlling refrigerating operations, maintaining constant temperature conditions in dryers, and the like). A shield 45 completely surrounds the bellows 15 in Figure IV and retards the flow of heat to and from said bellows. The full response of the fluid contained therein is thus delayed and a movement differential is consequently established between the points 18 and 19 of the lever 13 at a time of process temperature change. In operation, the movement characteristics of this form of the invention corresponding to process temperature conditions are the same as those outlined under the discussion of the form of the invention shown in Figure I. The graphical analysis of said operating conditions hereinbefore presented applies equally to any and all modifications of the invention.

It will be understood that the pressure and/or temperature changes which affect the apparatus of the invention may be the result of other physical changes within the system or process under regulation. In such instances the regulating apparatus is responsive to and operates through temperature and/or pressure as an intermediate agency for transmitting the effect of the process physical change to the control apparatus although such physical change may not be one of temperature or pressure.

We claim:

1. In an apparatus for controlling physical changes in a controlled system, two mechanical devices connected for movement in the same sense and responsive to the same physical condition of the controlled system, means for occasioning movement of one of said devices in full and immediate response to a change in said physical condition, means for delaying the full movement response of the other of said devices to said physical change, the rate of movement of each of said mechanical devices being independent of the rate of movement of the other and occasioning a differential in rate of movement therebetween, the magnitude of said movement differential being a function of the rate of said physical change, and means for transmitting the effect of said movement differential to operation-control devices.

2. An apparatus for controlling physical changes in a controlled system, which comprises two mechanical devices connected for movement in the same sense and separately responsive to the same physical condition of the controlled system, means for occasioning movement of said devices in response to a change in said physical condition, means for delaying the full extent of such movement response of one of said devices to occasion a differential in rate of movement therebetween, the magnitude of such differential being a function of the rate of said physical change, and means for transmitting the effect of said movement differential to operation-control devices.

3. An apparatus for controlling physical changes in a controlled system, which comprises two mechanical devices connected for movement in the same sense and separately responsive to the same physical condition of the controlled system, self-contained means for occasioning movement of said devices in response to a change in said physical condition, means for delaying the full extent of such movement response of one of said devices to occasion a differential in rate of movement therebetween, the magnitude of such differential being a function of the rate of said physical change, and means for transmitting the effect of said movement differential to operation-control devices.

4. An apparatus for controlling pressure changes in a controlled system, which comprises two mechanical devices connected for movement in the same sense and separately actuated by pressures responsive to the pressure of the controlled system, means for occasioning movement of said devices in response to a change in said pressure, means for delaying the full extent of such movement response of one of said devices to occasion a differential in rate of movement therebetween, the magnitude of such differential being a function of the rate of said pressure change, and means for transmitting the effect of said movement differential to operation-control devices.

5. An apparatus for controlling temperature changes in a controlled system, which comprises two mechanical devices connected for movement in the same sense and separately actuated by pressures responsive to the temperature of the controlled system, means for occasioning movement of said devices in response to a change in said temperature, means for delaying the full extent of such movement response of one of said devices to occasion a differential in rate of movement therebetween, the magnitude of such differential being a function of the rate of said temperature change, and means for transmitting the effect of said movement differential to operation-control devices.

6. An apparatus for controlling physical changes in a controlled system, which comprises two bellows devices connected for movement in the same sense and actuated by pressures responsive to the physical condition of the controlled system, means for occasioning movement of said devices in response to a change in said physical condition, means for delaying the full extent of such movement response of one of said devices to occasion a differential in rate of movement therebetween, the magnitude of such differential being a function of the rate of said physical change, and means for transmitting the effect of said movement differential to operation-control devices.

7. In an apparatus for controlling physical changes in a controlled system, two bellows devices connected for movement in the same sense and actuated by pressures responsive to the same physical condition of the controlled system, means for causing the pressure actuating one of said devices to vary in full and immediate response to a change in said physical condition, means for causing the pressure actuating the other of said devices to vary in delayed response to said physical change, the rate of movement of each of said bellows devices being independent of the rate of movement of the other and occasioning a differential in rate of movement therebetween, the magnitude of said movement differential being a function of the rate of said physical change, and means for transmitting the effect of said movement differential to operation-control devices.

8. In an apparatus for controlling physical changes in a controlled system; two devices connected for independent movement in the same sense in response to the same physical condition of the controlled system; a member movable in the same sense by both of said members; means for occasioning movement of one of said devices in full and immediate response to a change in said physical condition; means for delaying the full movement response of the other of said devices to said physical change, the rate of movement of each of said devices being independent of the rate of movement of the other and occasioning a differential in the rate of movement therebetween and the magnitude of said movement differential being a function of the rate of said physical change; operation-control means associated with said member and actuable thereby; means connecting said one device to said member for moving the latter to actuate said operation-control means in determined proportion to the extent of change in said physical condition; and means connecting said other device to said member for simultaneously moving the latter to vary the actuation of said operation-control means thereby in accordance with the said differential between the rates of movement of said devices.

9. In an apparatus for controlling physical changes in a controlled system; two devices connected for movement in the same sense in response to the same physical condition of the controlled system; a member movable in the same sense by both of said members; means for occasioning movement of one of said devices in full and immediate response to a change in said physical condition; means for delaying the movement response of the other of said devices to said physical change, the rate of movement of each of said devices being independent of the rate of movement of the other and occasioning a differential in the rate of movement therebetween and the magnitude of said movement differential being a function of the rate of said physical change; operation-control means actuable by said member; means connecting said one device to said member for moving the latter to actuate said operation-control means in determined proportion to the extent of change in said physical condition; and means connecting said other device to said member for moving the latter to vary the movement of said member by said one device for modifying the actuation of said operation-control means thereby in accordance with the rate of change of said physical condition.

10. In an apparatus for controlling physical changes in a controlled system; two devices connected for independent movement in the same sense in response to the same physical condition of the controlled system; a member movable in the same sense by both of said members; means for occasioning movement of one of said devices in full and immediate response to a change in said physical condition; means for delaying the full movement response of the other of said devices to said physical change, the movement of each of said devices being independent of the other and occasioning a differential in the rate of movement therebetween and the magnitude of said movement differential being a function of the rate of said physical change; operation-control means actuable by said member; and means connecting both of said devices to said member to form floating pivots for transmitting to said operation-control means the movement effected by the other device for causing said member to actuate said operation-control means to an extent disproportionate to the extent of said physical change and proportionate to the rate of said physical change.

LUIS DE FLOREZ.
EMMON BACH.